Dec. 5, 1961   D. DRUESEDOW   3,012,159
TERMINAL ARRANGEMENT FOR ELECTRICAL APPARATUS
Filed Aug. 31, 1959
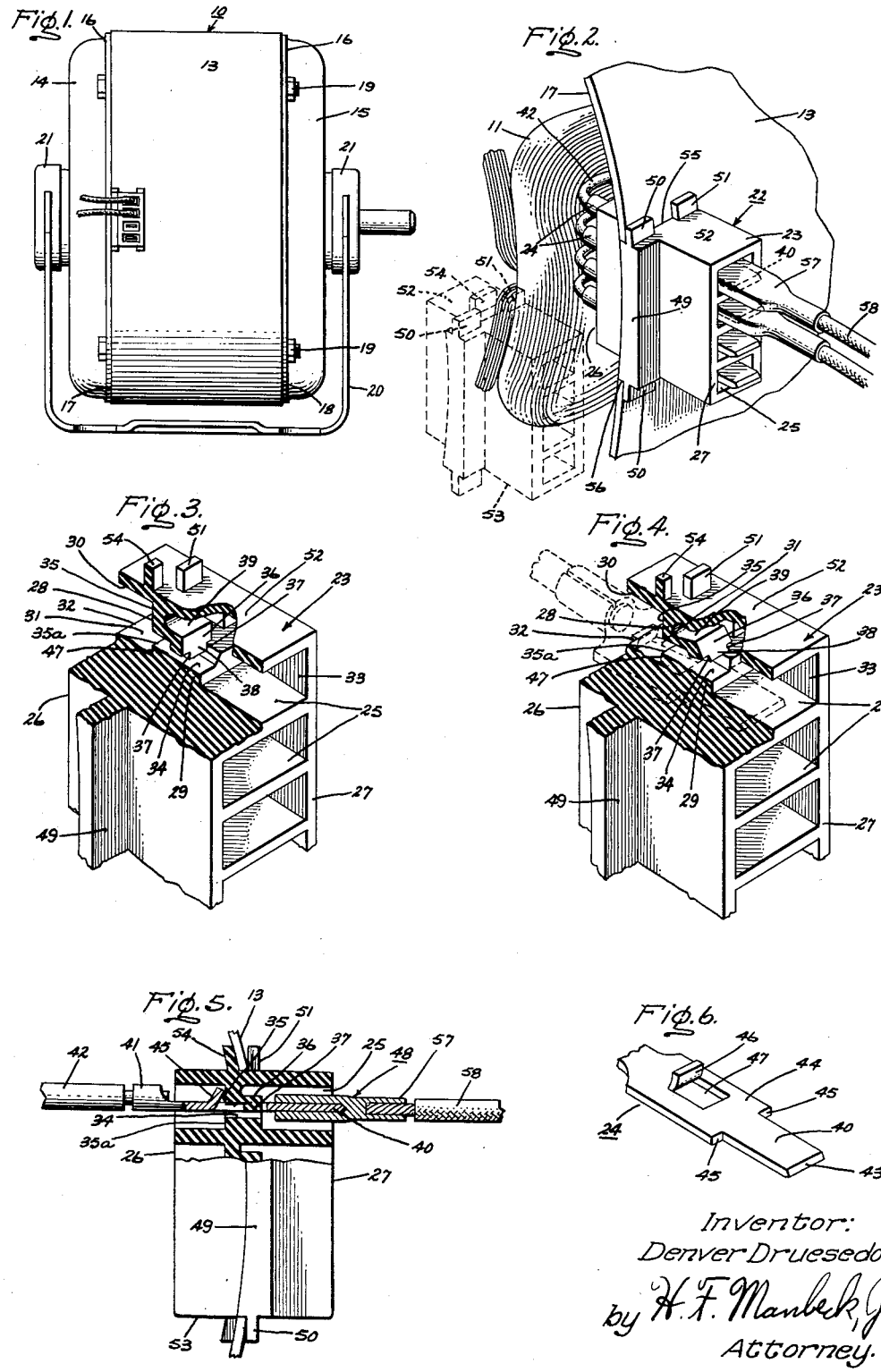
Inventor:
Denver Druesedow
by H. F. Manbeck, Jr.
Attorney.

United States Patent Office 3,012,159
Patented Dec. 5, 1961

3,012,159
TERMINAL ARRANGEMENT FOR
ELECTRICAL APPARATUS
Denver Druesedow, Fort Wayne, Ind., assignor to General Electric Company, a corporation of New York
Filed Aug. 31, 1959, Ser. No. 837,149
10 Claims. (Cl. 310—71)

This invention relates to electrical connectors particularly suitable for use with electric apparatus, and more specifically to an improved terminal arrangement for electric motors.

Electric apparatus, for example electric motors, must incorporate some type of terminal arrangement whereby the internal electric components of the apparatus can be electrically attached to external conductors for making electrical operating connection with a suitable power source. Since such arrangements, although essential to the operation of the electrical apparatus, do not affect the efficiency or performance of the apparatus itself, it is most desirable to keep the space they utilize and the expense of providing them to an absolute minimum. This is particularly true in the case of small dynamoelectric machines and more particularly motors where there is a great commercial competition and where, consequently, even small changes in the cost or size of the motor can become of paramount importance.

In the past, it has been customary to provide in such motors, a terminal board arrangement utilizing insulating material. The board was provided with the necessary terminal secured thereon and was mounted in the motor. This arrangement was relatively expensive, requiring a special motor construction, and usually resulted in a terminal which was relatively inaccessible. Moreover, in addition to the size and cost objection, the terminal board construction was unsatisfactory from the standpoint of the extra time and trouble involved in the amount of disassembly and reassembly required before the terminal board was properly asembled in the motor and the connection of the external conductors to the terminal construction. For instance, where motors are assembled into apparatus produced on an assembly line basis; e.g. room air conditioners, unless the connection of the motor can be effected swiftly and simply, it appreciably adds to the overall cost of the apparatus in which it is used by virtue of the extra labor involved in the assembly. This problem of terminal assembly and the type of connection made with outside conductors is greatly magnified in the motor industry since it is the general practice in the production and manufacture of motors to utilize the terminal arrangement for testing the internal electrical components of the motor.

Consequently, it will be seen that the provision of a satisfactory yet inexpensive terminal arrangement is a continuing problem in motor manufacture, particularly in the small horsepower sizes. It is, therefore, essential that a terminal be provided which is low in cost to produce, is easily and quickly assembled in a motor, necessitates little, if any, structural change or increase in size of the motor and can be swiftly and easily connected with an outside power source.

It is therefore an object of the present invention to provide an improved terminal arrangement for electric apparatus incorporating the desirable features described above.

A further object of the invention is the provision of a simple terminal construction, economical to manufacture, easy to assemble in an electric motor, and suitable for quick connection with an external power source.

In carrying out the objects of this invention in one form thereof, I provide a terminal assembly for use with an electric motor in which a terminal supporting block, molded from a hard springy insulating material, is provided with a plurality of channels extending completely through the block for accommodating a quick-connect terminal member. The terminal member has a male terminal portion at its one end for connection to a source of electrical power and means at its other end for connection with a wire conductor. A slot is provided intermediate the terminal ends. Each channel has locking means for retaining a terminal member therein in the form of a projection integrally provided with the wall of the channel, projecting towards the opposite channel wall. The projection has a locking portion normally biased toward the opposite wall and extends through the terminal slot to hold the terminal member within the channel. This locking portion is provided such that it is movable away from the opposite wall when the male terminal portion of the terminal member engages it, allowing the insertion of the terminal member into the channel.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawing.

In the drawing:

FIG. 1 is a side view of an electric motor incorporating in one form thereof the improved terminal arrangement of the present invention;

FIG. 2 is an enlarged fragmentary view in perspective of the improved terminal arrangement illustrated in FIG. 1 to illustrate details of the preferred embodiment;

FIG. 3 is a fragmentary view in perspective, broken away in part to illustrate detail, of the terminal supporting block of the improved terminal construction shown in FIG. 2;

FIG. 4 is a similar view to FIG. 3 showing the terminal supporting block during insertion of a single motor terminal;

FIG. 5 is a fragmentary side view, partially broken away of the improved terminal arrangement shown in FIG. 2, illustrating the engagement of an outside terminal with the motor terminal; and FIG. 6 is a fragmentary view in perspective of the motor terminal.

Referring now to the figures of the drawing, in FIG. 1 there is shown an electric motor of the squirrel cage type, generally indicated at 10. The motor is of standard construction comprising stator and rotor assemblies (not shown) with the stator having conventional energizing windings 11 (see FIG. 2). The stator and rotor are contained within a motor frame 12, which for convenience and ease of assembly, is illustrated as being formed of three members: a central cylindrical shell 13 and two identical cup-shaped end shields 14 and 15, each end shield having a radially extending flange 16. The end shields are secured to shell 13 in any suitable manner, such as by abutting each end shield flange 16 against the respective adjacent shell edge, 17 and 18 and holding the frame assembly together by a nut and bolt arrangement, generally indicated at 19. Motor 10 may be supported in the conventional way as by a generally U-shaped stationary base 20 which engages and coacts with hubs 21 of each end shield.

In order to connect the motor windings 11 to a suitable source of energizing power (not shown), I provide the following improved arrangement. As seen in FIG. 2, a terminal assembly generally denoted by numeral 22, in its preferred form comprises a terminal supporting block 23 and a suitable number of quick-connect type motor terminals 24 which for purposes of illustration are shown as being four in number.

As seen more clearly in FIGS. 3-5, supporting block 23 is molded in a single substantially rectangular box-like piece from any suitable hard springy insulating dielectric material, such as nylon. The block is formed with a plurality of parallel passageways or channels 25 (shown as four in number) for receiving and securing the motor terminals therein. As illustrated, the channels are arranged in a row, equally spaced one from another along the length of the block, and extend completely through the block from its inner longitudinal face 26 to its outer face 27. Since in the preferred embodiment each of the channels 25 are constructed in the same manner, for reasons of brevity and simplicity, only the upper channel (as viewed in the drawing) will be described in detail.

With specific reference to FIG. 3, it will be seen that the illustrated channel is substantially rectangular in transverse cross section having an upper and lower projection, 28 and 29, integrally formed on the respective upper and lower (as viewed in the drawing) opposing internal walls 30 and 31. The projections are located somewhat centrally between the inner and outer channel entrances 32 and 33 with upper projection 28 being arranged directly above and in spaced relation to lower projection 29. These projections cooperate with and engage motor terminal 24 to hold the terminal securely within channel 25 in a manner which will become more apparent as the description proceeds.

Lower projection 29 is suitably provided with a central recess 34, extending parallel with the channel internal walls to allow passage therethrough of a portion of motor terminal 24 (to be subsequently described in detail) and to accommodate another portion thereof. On its inner side disposed towards the inner channel entrance 32, upper projection is provided with an abutment 35 parallel to the outer faces 26 and 27 of the block. In addition, upper projection is formed with a downwardly protruding movable terminal locking portion 36 having a pair of identical spaced apart shoulders 37 and a finger 38 positioned therebetween projecting towards recess 34 of the lower projection 29. Locking portion 36 is normally biased toward recess 34 by the spring like arm 39 integrally joining portion 36 to the upper channel wall 30. The significance of this construction will become more apparent as the description proceeds.

Motor terminal 24, which is accommodated in channel 25, will now be described with reference to FIGS. 5 and 6 in particular. Terminal 24, stamped from any suitable electrical conducting material, is formed into a single generally flat longitudinally extending member having a male terminal portion 40 provided at its forward end and means 41 at its other end, such as a ferrule arrangement, for connecting the terminal to internal wire leads 42, which, in turn, may be suitably connected with the motor windings 11 in any well known fashion (not shown). For convenience of assembly, the leading edge 43 of the male portion is V shaped. Intermediate its ends, terminal 24 has a body portion 44 being slightly greater in width than male portion 40 thereby forming a pair of spaced apart shoulders 45. A substantially rectangular tab 46 is stamped from the terminal body portion 43, projecting outwardly from the body portion, to form a means for stopping forward movement of terminal 24 within the channel 25 and to furnish a slot 47 for receiving finger 38 of upper projection of the locking portion 36.

In the assembly of the terminal arrangement, referring to FIGS 3-5 inclusive, motor terminal 24, with its tab 45 projecting upwardly and its male portion 40 in the forward position, is inserted into channel 25 through the inner channel entrance 32. The terminal is moved forward until its leading edge 43 enters recess 34 of the lower projection 29 and engages the movable locking portion 36 of the upper projection 28, which is normally biased toward recess 34 (see FIG. 3). Further inward movement of the terminal will cause leading edge 43 to urge locking portion 36 away from recess 34, as illustrated in FIG. 4, allowing the male portion 40 of the terminal to pass therebetween. Terminal 24 is moved forward until the male portion 40 has passed entirely beyond recess 34 and the terminal slot 47 is aligned with finger 38 of locking portion 36. Due to the fact that the locking portion is normally biased toward recess 34, finger 38 will return to its original position adjacent recess 34, entering and extending through the terminal slot 47 with its shoulders 37 resting on the upper surface of the terminal body 44 adjacent terminal slot 47. Thus, locking portion 36 and terminal slot 47 cooperate to anchor and lock the terminal 24 firmly within channel 25, thereby preventing the terminal from endwise movement and being withdrawn from the supporting block.

This locking action is further ensured by the engagement of terminal tab 46 with the upper projection abutment 35, which will effectively resist any sudden and violent forward jerking motion of the terminal 24, such as, for example, might be caused by the disconnection of the outside terminal means, generally indicated at 48 (FIG. 5) from the motor terminal 24. Although the terminal assembly procedure has been described as being effected with the terminal tab 46 projecting upwardly, it should be obvious that the lower projection may also be furnished with an abutment for engagement with the terminal tab 46 such as indicated at 35a in FIGS. 3–5, disposed on its inner side in vertical alignment with the upper projection abutment 35. This construction has the desirable feature of permitting the assembly of terminal 24 and the terminal supporting block 23, with the terminal tab 46 being in either vertical direction, that is, projecting up or down from the terminal body 44.

Preferably, terminal block 23 is mounted onto motor frame 12 in the manner illustrated by the drawing. In the preferred mounting arrangement, block 23 is formed with a longitudinal integral spacer rib 49 provided intermediate and parallel to the respective inner and outer block faces 26 and 27. A resilient protruding tab 50 is integrally arranged at each end of the rib in transverse alignment and spaced from a second tab 51 provided on each of the respective upper and lower block surfaces 52 and 53. A third tab 54 is positioned between each pair of tabs 50 and 51 and slightly inward thereof toward the inner block face 26. With this construction, the three tabs, 50, 51 and 54 on each of the upper and lower surfaces of block 23 are adapted to cooperate with the opposed edges of any suitable opening provided in the motor frame 12 for receiving the terminal supporting block 23. As illustrated in FIGS. 1 and 2, the opening 55, complementary in shape to the outer rectangular configuration of block 23, is provided in shell 13, adjacent shell edge 17. Opening 55 is therefore shown as being, in effect, a three-sided slot having its open side 56 conterminous with the shell edge 17 for easy access thereto.

Block 23 may be assembled into the shell opening 55, either before or after the desired number of motor terminals 24 have been inserted and secured into the accommodating channels 25 as previously described, but prior to the securement of the end shields 14 and 15 to shell 13. Block 23 is slid into the slot with its tabs 50 and 51 positioned on the outer side of the shell and tab 54 on the inner surface. Thereafter the assembly of the terminal assembly 22 and motor frame 12 may be completed by placing the flange 16 of end shield 14 against the shell edge 17 and the block rib 49 and the end shield 15 against the other shell edge 18. The end shields and shell may then be drawn together and secured by tightening the nut and bolt arrangement 19. It should be apparent to those skilled in the art that the block receiving opening 55 could be furnished in the motor frame 12 at a location other than the one shown, such as for example, in shell 13 centrally between the shell edges 17 and 18, in which case the resilient tabs 54 could be pressed through the opening 55, the block being held in place in the manner outlined previously.

Once terminal assembly 22 and motor 10 have been completely assembled, it is then an exceedingly simple matter to connect the internal electrical components of the motor; e.g. energizing coils 11, to a suitable source of power (not shown). The outer terminal means 48, for instance quick-disconnect type female terminal members 57 provided on the ends of external conductors 56, may be inserted through the outer channel entrances 33 into mating engagement with the male portions of the motor terminals 24, thereby effecting a proper, yet simple electrical connection for the electrical motor components.

It will be readily manifest from the foregoing that the advantages of this invention are numerous. For example, the terminal construction is extremely inexpensive to manufacture, includes the minimum of component parts and is quickly and easily installed, providing an efficient and mechanically strong electrical connection between the internal electrical component parts and the external energizing means. Further, the improved terminal arrangement can be efficiently utilized for motor testing purposes during the manufacture of the motor or other electrical device, as well as for electrical operation connections by which the electrical device apparatus may be run in actual practice after such apparatus has been completely assembled.

It should be apparent to those skilled in the art, while I have shown and described what at present is considered to be the preferred embodiment of my invention in accordance with the patent statutes, changes may be made in the structure disclosed (it is to be understood that modifications can be made) without actually departing from the true spirit and scope of this invention, and I therefore intend to cover in the following claims all such equivalent variations as fall within the invention.

What I claim as new and desire to secure by Letters Patent of the United States is:

1. In an electrical apparatus having internal electrical parts and a frame for carrying said parts, a terminal supporting block mounted on said frame and communicating with said internal parts, said block comprising a molded insulating body formed of hard springly material having a plurality of channels extending completely through said body, each of said channels being formed to accommodate a terminal member connected to said electrical parts and having a locking means for retaining said terminal member therein, said locking means comprising at least one projection formed integrally with the wall of each channel and projecting toward the opposite wall, said projection having a movable locking portion normally biased toward said opposite wall for retaining said terminal member in said channel and movable away from said opposite wall to allow the insertion of said terminal member into the channel.

2. In an electric motor having energizing windings and a motor frame, an electrical terminal assembly mounted through said frame for connecting said windings to a source of energizing power, said electrical terminal assembly having a terminal supporting block comprising a molded insulating body formed of hard springy material having a plurality of channels extending completely through said body and a quick-connect terminal member accommodated in at least one of said channels, said terminal member formed with a male terminal portion at its one end for connection to a source of power and means at its other end for connection with said windings, said terminal member having a slot formed intermediate its ends, each of said channels having locking means for retaining said terminal member therein, said locking means comprising at least one projection formed integrally with the wall of the channel and projecting towards the opposite wall, said projection having a movable locking portion normally biased toward said opposite wall extending through said terminal slot for retaining said terminal member within said channel, said locking portion being movable away from said opposite wall to allow the insertion of said terminal member into the channel.

3. In an electrical terminal assembly, a terminal supporting block comprising a molded insulating body formed of hard springy material having a plurality of channels extending completely through said body, a quick-connect terminal member accommodated in at least one of said channels, said terminal member formed with a male terminal portion at its one end for connection to a source of power and means at its other end for connection with a wire conductor, said terminal member having a slot formed intermediate its ends, each of said channels having locking means for retaining said terminal member therein, said locking means comprising at least one projection formed integrally with the wall of the channel and projecting towards the opposite wall, said projection having a movable locking portion normally biased toward said opposite wall extending through said terminal slot for retaining said terminal member within said channel, said locking portion being movable away from said opposite wall to allow the insertion of said terminal member into the channel.

4. In an electrical terminal assembly, a terminal supporting block comprising a molded insulating body formed of hard spring material having a plurality of channels extending completely through said body, a quick-connect longitudinally extending terminal member accommodated in at least one of said channels, said terminal member formed with a male terminal portion at its one end for connection to a source of power and means at its other end for connection with a wire conductor, said terminal member having a slot formed intermediate its ends, each of said channels having a locking means for retaining said terminal member therein, said locking means comprising first and second projections formed integrally on opposite walls of the channel between the ends thereof and protruding toward each other, said first projection having a recess provided therethrough and accommodating the portion of said terminal member having said slot, and a second projection having an integral movable locking portion normally biased into said recess through said terminal slot for retaining said terminal member in said channel, said locking portion being movable away from said recess to allow the insertion of said terminal member into the channel.

5. In an electrical terminal assembly, a terminal supporting block comprising a molded insulating body formed of hard springy dielectric material having a plurality of channels substantially rectangular in cross section extending completely through said body, a quick-connect longitudinally extending terminal member accommodated in at least one of said channels, said terminal member formed with a male terminal portion at its one end for connection to a source of power and means at its other end for connection with a wire conductor; said terminal member having a projecting tab and a slot formed intermediate its ends, each of said channels having locking means for retaining said terminal member therein, said locking means comprising first and second projections formed integrally on opposite walls of the channels substantially centrally thereof between the ends of the channels and protruding towards each other, said first projection having a recess provided therethrough parallel to the walls of said channel and accommodating the portion of said terminal member having said slot, said second projection having an integral movable locking portion normally biased into said recess of said first projection through said slot thereby retaining said terminal member in said channel, said locking portion being movable away from said recess during the insertion of said terminal member into the channel to allow the male terminal portion to pass entirely through said recess, and at least one of said projections having abutment means thereon axially displaced from said locking portion to cooperate with and engage the tab of said terminal member for limiting the axial forward movement of said terminal member through said channel.

6. For use in an electrical terminal assembly, a terminal supporting block comprising a molded insulating body formed of hard springy material having a plurality of channels extending completely through said body, each of said channels being formed to accommodate a terminal member and having a locking means for retaining said terminal member therein, said locking means comprising at least one projection formed integrally with the wall of each channel and projecting toward the opposite wall, said projection having a movable locking portion normally biased toward said opposite wall for retaining said terminal member in said channel and movable away from said opposite wall to allow the insertion of said terminal member into the channel.

7. For use in an electrical terminal assembly, a terminal supporting block comprising a molded insulating body formed of dielectric material having a plurality of channels extending completely through said body, each of said channels being formed to accommodate a terminal member and each having locking means for retaining said terminal member therein, said locking means comprising first and second projections formed integrally on opposite walls of the channel between the ends of the channel and protruding toward each other, said first projection having a recess provided therethrough for accommodating said terminal member when said member is inserted into the channel, and said second projection having a movable locking portion normally biased into said recess of said first projection for retaining said terminal member in said channel and movable away from said recess to allow the insertion of said terminal member into the channel.

8. For use in an electrical terminal assembly, a terminal supporting block comprising a molded insulating body formed of hard springy dielectric material having a plurality of channels substantially rectangular in cross section extending completely through said body and being arranged in at least one row, each of said channels being formed to accommodate a quick-connect terminal member and each having locking means for retaining said terminal member therein, said locking means comprising first and second projections formed integrally on opposite walls of the channel substantially centrally thereof between the ends of the channel, said projections protruding toward each other and at least one of said projections having abutment means thereon for limiting the axial movement of said terminal member through said channel, said first projection having a recess provided therethrough parallel to the walls of said channel and axially beyond said abutment means for accommodating said terminal member when said member is inserted into the channel, and said second projection having a movable locking portion normally biased into said recess of said first projection for retaining said terminal member in said channel and movable away from said recess to allow the insertion of said terminal member into the channel.

9. In an electric motor having energizing windings, a frame including a shell member and an end shield member arranged at each end of said shell member, an opening formed in said shell member at its peripheral edge thereof with the adjacent portion of said end shield member defining one side of said opening, a terminal supporting block disposed in said opening and formed on its peripheral surface with a plurality of projections for maintaining said block in said opening, said block comprising a molded insulating body formed of hard springy material having at least one channel extending completely through said body and communicating with the interior of said motor, said channel having locking means for retaining therein a terminal member connected with said windings, said locking means including at least one projection formed integrally with the wall of said channel and projecting toward the opposite wall thereof, said projection having a movable locking portion normally biased toward said opposite terminal for retaining said terminal member in said channel and movable away from said opposite wall to allow the insertion of said terminal member into the channel.

10. In an electric motor having energizing windings, a frame including a shell member disposed between a pair of end shield members, one of said members formed with an opening at its peripheral edge thereof with the adjacent portion of one of said other members defining one side of said opening, a terminal supporting block arranged in said opening and formed with means to maintain said block in said opening, said block comprising a molded insulating body having at least one channel extending completely through said body and communicating with the interior of said frame, said channel being formed to accommodate a terminal member attached to said energizing windings for connecting said windings to a source of energizing power said channel having locking means for retaining said terminal member therein.

References Cited in the file of this patent
UNITED STATES PATENTS

| | | |
|---|---|---|
| 2,032,470 | Chirelstein | Mar. 3, 1936 |
| 2,640,970 | Falge et al. | June 2, 1953 |
| 2,685,073 | Damon | July 27, 1954 |
| 2,688,123 | Benham et al. | Aug. 31, 1954 |
| 2,739,294 | Batcheller | Mar. 20, 1956 |
| 2,802,958 | Curley | Aug. 13, 1957 |
| 2,805,405 | Batcheller | Sept. 3, 1957 |

FOREIGN PATENTS

| | | |
|---|---|---|
| 793,562 | Great Britain | Apr. 16, 1958 |